(12) United States Patent
Kvamme

(10) Patent No.: US 8,129,316 B2
(45) Date of Patent: Mar. 6, 2012

(54) METHOD OF CREATING A CARBON DIOXIDE HYDRATE

(75) Inventor: Bjorn Kvamme, Bergen (NO)

(73) Assignee: Bergen Teknologioverforing AS, Bergen (NO)

( * ) Notice: Subject to any disclaimer, the term of this patent is extended or adjusted under 35 U.S.C. 154(b) by 279 days.

(21) Appl. No.: 12/456,698

(22) Filed: Jun. 19, 2009

(65) Prior Publication Data

US 2010/0323928 A1 Dec. 23, 2010

(51) Int. Cl.
*C09K 8/68* (2006.01)
*C09K 8/52* (2006.01)
*C09K 8/64* (2006.01)
*C09K 8/584* (2006.01)
*C09K 8/60* (2006.01)
*C04B 33/04* (2006.01)
*C23F 11/14* (2006.01)
*C23G 1/06* (2006.01)
*C01B 31/20* (2006.01)

(52) U.S. Cl. .......... 507/211; 507/90; 507/203; 507/238; 507/244; 507/259; 507/266; 507/267; 423/437.1

(58) Field of Classification Search ............... 507/90, 507/211, 203, 267, 244, 259, 266, 238; 423/437, 423/437.1
See application file for complete search history.

(56) References Cited

U.S. PATENT DOCUMENTS

| 5,261,490 A | 11/1993 | Ebinuma |
| 2003/0178195 A1* | 9/2003 | Agee et al. ............ 166/248 |
| 2006/0060356 A1 | 3/2006 | Graue et al. |

FOREIGN PATENT DOCUMENTS

JP 06-071161 3/1994

OTHER PUBLICATIONS

Svandal et al., "The phase-field theory applied to $CO_2$ and $CH_4$ hydrate", Journal of Crystal Growth 287 (2006) pp. 486-490.
Tegze et al., "Multiscale approach to $CO_2$ hydrate formation in aqueous solution: Phase field theory and molecular dynamics. Nucleation and growth", The Journal of Chemical Physics 124, 234710 (2006) pp. 1-12.
Buanes et al., "Computer simulation of $CO_2$ hydrate growth", Journal of Crystal Growth 287 (2006) pp. 491-494.
Buanes et al., "Two Approaches for Modelling Hydrate Growth", pp. 1-5.
Kvamme et al., "Hydrate Sealing Effects Related to Storage of $CO_2$ in Cold Reservoir".
Kvamme et al., "Kinetics of hydrate growth on the $CO_2$/aqueous solution interface" WSEAS Transactions on Heat and Mass Transfer, Issue 5, vol. 1, May 2006, pp. 612-616. ISSN: 1790-5044.
Kvamme et al., "Storage of $CO_2$ in natural gas hydrate reservoirs and the effect of hydrate as an extra sealing in cold aquifers", International Journal of Greenhouse Gas Control I (2007), p. 236-246.
Kvamme et al., "Energy from natural gas hydrate combined with reservoir storage of $CO_2$" Department of Physics and Technology, University of Bergen.
Buanes, Thesis 2008. Mean-field approaches applied to hydrate phase transition kinetics.Bergen. ISBN.
Svandal, Thesis, Modeling hydrate phase transitions using mean-field approaches, Dissertation for the degree philosophiae doctor (PhD), at the University of Bergen, Feb. 2006.
Kvamme et al., "Thermodynamic Stability of Hydrates for Ethane, Ethylene, and Carbon Dioxide" J. Phys. Chem., 1995, vol. 99, pp. 7114-7119.
Hirohama et al., "Conversion of $CH_4$-hydrate to $CO_2$-hydrate in liquid $CO_2$", Journal of Chemical Engineering of Japan, vol. 29, 1996, pp. 1014-1020.
Nakano et al., "Natural gas exploitation by carbon dioxide from gas hydrate fields—high-pressure phase equilibrium for an ethane hydrate system", Proc. Instn. Mech. Engrs. vol. 212 Part A, 1998, pp. 159-163.
Kvamme et al., "Hydrate dissociation in chemical potential gradients: theory and simulations", Fluid Phase Equilibria 217 (2004) pp. 217-226.
Svandal et al., "Thermodynamic properties and phase transitions in the $H_2O/CO_2/CH_4$ system", Phys. Chem. Chem. Phys., (2006) 8 pp. 1707-1713.
Tegze et al., "Multiscale approach to $CO_2$ hydrate formation in aqueous solution: Phase field theory and moleuclar dynamics. Nucleation and growth", The Journal of Chemical Physics 124, 234710 (2006) pp. 1-12.
Gránásy et al., "Phase field theory of crystal nucleation in hard sphere liquid", Journal of Chemical Physics, vol. 119, No. 19, Nov. 15, 2003, pp. 10376-10382.
Lümmen et al., "Molecular dynamics simulations of growth and properties of $FeCl_2$-NaCl-nanoparticles in supercritical water", Physical Chemistry Chemical Physics, 2009 11 pp. 9504-9513.
Lümmen et al., "Formation of $FeCl_2$/NaCl-nanoparticles in supercritical water investigated by molecular dynamics simulations: nucleation rates", Physical Chemistry Chemical Physics, 2008 10 pp. 6405-6416.
Lümmen et al., "Kinetics of NaCl nucleation in supercritical water investigated by molecular dynamics simulations", Physical Chemistry Chemical Physics, 2007 9 pp. 3251-3260.

(Continued)

Primary Examiner — Timothy J. Kugel
Assistant Examiner — Atnaf Admasu
(74) Attorney, Agent, or Firm — George W. Neuner; Edwards Wild Palmer LLP

(57) ABSTRACT

A method of creating a carbon dioxide hydrate is disclosed. The preferred steps include supplying liquid carbon dioxide and a dissociation agent to a hydrocarbon hydrate, decomposing the hydrocarbon hydrate by the dissociation agent into a hydrocarbon gas and liquid water, and forming the carbon dioxide hydrate from the liquid carbon dioxide and the liquid water. The dissociation agent preferably is at least one of an inorganic salt, a surface active agent, a hydrate inhibitor, and an absorption solution. Furthermore, a substance composition of liquid carbon dioxide and the dissociation agent is described, which is provided for depositing carbon dioxide hydrate in a subterranean geological formation. Furthermore, a deposition device is described, which is configured for depositing carbon dioxide hydrate in a subterranean geological formation.

26 Claims, 2 Drawing Sheets

OTHER PUBLICATIONS

Kvamme, "Thermodynamic properties and dielectric constants in water/methanol mixtures by integral equation theory and molecular dynamics simulations", Physical Chemistry Chemical Physics, 2002 4 pp. 942-948.

Kuznetsova et al., "Thermodynamic properties and interfacial tension of a model water-carbon dioxide system", Physical Chemistry Chemical Physics., 2002 4 pp. 937-941.

Svandal et al., "Thermodynamic properties and phase transitions in the $H_2O/CO_2/CH_4$ system", Fluid Phase Equilibria 246 (2006) pp. 177-184.

Kvamme, "Molecular dynamics simulations and integral equations studies of model systems for aqueous mixtures of small alcohols", Fluid Phase Equilibria 131 (1997) pp. 1-20.

Kvamme, "Molecular dynamics simulations for selection of kinetic hydrate inhibitors", Journal of Molecular Graphics and Modelling, 23 (2005) pp. 524-536.

Lümmen et al., "Determination of nucleation rates of FeC12 in supercritical water by molecular dynamics simulations", The Journal of Supercritical Fluids, 47 (2008) pp. 270-280.

Buanes et al., "Computer simulation of $CO_2$ hydrate growth", Journal of Crystal Growth, 287 (2006) pp. 491-494.

Hovland et al., "Salt formation associated with sub-surface boiling and supercritical water", Marine and Petroleum Geology 23 (2006) pp. 855-869.

Kuznetsova et al., "Grand canonical molecular dynamic simulations for polar and interfacial systems", Journal of Molecular Liquids, 113 (2004) pp. 75-80.

Schmidt et al., "Calculation of the interfacial tension of the methane-water system with the linear gradient theory", Fluid Phase Equilibria 261 (2007) pp. 230-237.

Shpakov et al., "Elastic moduli calculation and instability in structure I methane clathrate hydrate", Chemical Physics Letters 282, (1998) pp. 107-114.

Kuzentsova et al., "Atomistic computer simulations for thermodynamic properties of carbon dioxide at low temperatures", Energy Conversion and Management 43 (2002) pp. 2601-2623.

Graue et al., MRI Visualization of Spontaneous Methane Production From Hydrates in Sandstone Core Plugs When Exposed to $CO_2$, SPE 118851, Jun. 2008, pp. 146-152, XP-002569748.

Uddin et al., "$CO_2$ Hydrate Formation in Geological Reservoirs by Injection of $CO_2$ Gas", Petroleum Society, Paper 2007-204, Jun. 12, 2007, pp. 1-13, XP-002569749.

\* cited by examiner

METHOD OF CREATING A CARBON DIOXIDE HYDRATE

TECHNICAL FIELD

The present invention relates to a method of creating a carbon dioxide hydrate, in particular, the carbon dioxide hydrate being deposited in a subterranean geological formation. Furthermore, the present invention relates to a method of releasing a hydrocarbon gas from a hydrocarbon hydrate in a geological formation. Furthermore, the present invention relates to a substance composition, which is provided for releasing a hydrocarbon gas from a hydrocarbon hydrate and/or depositing carbon dioxide hydrate in a subterranean geological formation. Finally, the present invention relates to a deposition device, which is adapted for implementing the above carbon dioxide hydrate creating method, in particular, in combination with the above hydrocarbon gas releasing method. Applications of the invention exist in the deposition of carbon dioxide (carbon dioxide sequestration) in and collecting hydrocarbons from subterranean geological formations.

TECHNICAL BACKGROUND OF THE INVENTION

Since the discovery of natural hydrocarbon hydrates in subterranean geological formations, several approaches have been developed for releasing and collecting the hydrocarbon gas as an energy resource. One particular approach comprises replacing the hydrocarbon hydrate by carbon dioxide hydrate, which is expected to have advantages in terms of dumping carbon dioxide simultaneously with the collection of hydrocarbon gases. Several techniques for converting hydrocarbon into carbon dioxide hydrates have been proposed in the past.

Injecting liquid carbon dioxide into a gas hydrate formation has been proposed in U.S. Pat. No. 5,261,490 A (1993) and in JP 06-071161 (1994). With these techniques, it has been proposed to heat the gas hydrate with the liquid carbon dioxide resulting in melting the gas hydrate and a carbon dioxide hydrate formation. Disadvantages of this concept result from an uncontrolled melting of the gas hydrate, which may lead to an instability of the geological formation. Furthermore, the released hydrocarbon still includes large amounts of carbon dioxide, which have to be separated from the hydrocarbon gas and re-processed.

Further thermodynamic investigations of carbon dioxide and hydrocarbon gas hydrates have been described by B. Kvamme et al. ("J. Phys. Chem.", volume 99, 1995, p. 7114-7119) and by S. Hirohama et al. ("Journal of chemical engineering of Japan", volume 29, 1996, p. 1014-1020). S. Nakano et al. ("Proc. Instn. Mech. Engrs.", volume 212 A, 1998, p. 159-163) have described that the carbon dioxide hydrate formation is an exothermic reaction, which would heat the hydrocarbon hydrate. S. Hirohama et al. and S. Nakano et al. have introduced models of hydrate conversion, wherein a conversion rate is limited entirely by heat transport and corresponding enthalpy changes. On the contrary, B. Kvamme et al. have disclosed a differentiated model distinguishing process wherein the conversion rate is kinetically limited by the phase transition itself through Gibbs free energy differences or by mass and heat transport alone. While the theoretical conversion of the hydrocarbon to the carbon dioxide hydrate has been confirmed in these publications, practical implementations for processing geological hydrocarbon hydrates have not been investigated or proposed.

Another technique for injecting carbon dioxide and replacing methane in gas hydrates is described in US 2006/0060356 A1. A solid state conversion is described, wherein methane is replaced exclusively using the fact that carbon dioxide hydrate has a larger thermodynamic stability compared with methane hydrate. This conversion process is dominated by a solid state diffusion process, which may represent disadvantages in terms of a low conversion rate and low conversion efficiency. Another disadvantage may result from the fact that practical geological systems include mineral components, which may deteriorate the solid state conversion.

It is desirable to provide an improved method of creating a carbon dioxide hydrate, which method is capable of avoiding disadvantages of conventional techniques and which in particular is capable of replacing a hydrocarbon hydrate by a carbon dioxide hydrate with an increased reaction rate and an improved conversion efficiency. It also is desirable to provide an improved method of releasing a hydrocarbon gas from a subterranean geological formation. Such a method should be implemented in a controlled manner without destabilizing the geological formation. It would also be desirable to provide an improved substance composition, which facilitates the formation of a carbon dioxide hydrate in a subterranean geological formation. Still further, an improved deposition device for depositing carbon dioxide hydrate in a subterranean geological formation is desirable, which is capable of avoiding disadvantages of the conventional techniques and which is compatible with conventional borehole techniques and deposition devices.

SUMMARY OF THE INVENTION

According to a first embodiment of the invention, a method of creating a carbon dioxide hydrate is provided, wherein a mixture of liquid carbon dioxide and a dissociation agent is supplied to a hydrocarbon hydrate. According to the invention, the carbon dioxide hydrate is formed in a two-step process including a first step of dissociating the hydrocarbon hydrate facilitated with the dissociation agent, wherein a hydrocarbon gas and liquid water are formed, and a second step of forming the carbon dioxide hydrate from the liquid water and the liquid carbon dioxide. Although not being bound by theory, it is believed that, advantageously, the inventive method is based on a liquid phase reaction, which may have an increased conversion rate compared with the conversion based on solid state diffusion. Preferably, the hydrocarbon hydrate dissociation step results in a complete reaction of the hydrocarbon hydrate so that, with the inventive method, the conversion efficiency is essentially improved. According to a particularly preferred application of the invention, the carbon dioxide hydrate is produced in a subterranean geological formation, in which the hydrocarbon hydrate is located.

According to a second embodiment of the invention, a method of releasing a hydrocarbon gas from a hydrocarbon hydrate in a geological formation is provided, wherein a carbon dioxide hydrate is created in the geological formation according to the above first aspect for replacing the hydrocarbon hydrate and the released hydrocarbon gas is delivered to a surface of the geological formation. Advantageously, because the hydrocarbon hydrate preferably is completely replaced by the carbon dioxide hydrate, stability problems in the geological formation may be avoided.

According to a third embodiment of the invention, a substance composition is disclosed, which comprises liquid carbon dioxide mixed with a dissociation agent for dissociating a hydrocarbon hydrate.

According to a fourth embodiment of the invention, a deposition device for depositing carbon dioxide hydrate in a subterranean geological formation is provided. The inventive deposition device includes a mixing device, which produces a mixture of liquid carbon dioxide and a dissociation agent for dissociating a hydrocarbon hydrate. Furthermore, the deposition device includes a supply device for introducing the mixture into the subterranean geological formation. As a main advantage, the mixing device can be arranged preferably at a surface of the subterranean geological formation so that the inventive deposition device has a simple structure, which furthermore is compatible with conventional geological machinery.

Preferably, the dissociation agent facilitates the decomposition of the hydrocarbon hydrate into liquid water and hydrocarbon gas. Furthermore, the dissociation agent, as such, preferably does not form a hydrate. Therefore, the dissociation agent preferably is included in the liquid water after the decomposing step. Advantageously, the dissociation agent is dissolved at least partially in the liquid water, so that it is kept for the dissociation of further hydrocarbon hydrate. In particular, for a dissociation agent comprising a surfactant (e. g. ionic surfactant, polar surfactant, or bio surfactant), it follows an interface between $CO_2$ hydrate and aqueous solution or hydrocarbon hydrate.

According to another preferred feature of embodiments of the invention, a liquid phase boundary is formed between the hydrocarbon hydrate and the carbon dioxide hydrate. The liquid phase boundary allows a liquid mass transport of the carbon dioxide and the dissociation agent to the hydrocarbon hydrate. During the advancing conversion of the hydrocarbon hydrate, the liquid phase boundary is shifted through the hydrocarbon hydrate, so that the hydrocarbon hydrate is gradually replaced by the carbon dioxide hydrate. Simultaneously, the dissociation agent is included at least partially in the liquid phase boundary.

According to another advantageous feature of certain embodiments of the invention, a mechanical vibration can be applied to the hydrocarbon hydrate. The mechanical vibration facilitates the formation of cracks or enlargement of existing cracks in the hydrocarbon hydrate so that the reaction rate even can be increased. Other sources of additional energy to promote the formation of cracks or enlargement of existing cracks in the hydrocarbon hydrate, e.g., pulsed sound waves, also can be used.

According to preferred embodiments of the invention, the liquid phase boundary has a cross-sectional dimension (thickness) below 500 µm, more preferably below 100 µm. Furthermore, the liquid phase boundary preferably has a cross-sectional dimension (thickness) of at least 10 nm, more preferably at least 10 µm.

Various techniques for supplying liquid carbon dioxide and the dissociation agent are available. As an example both components could be delivered separately through a borehole tubing to the hydrocarbon hydrate. Preferably, a mixture of the liquid carbon dioxide and the dissociation agent is prepared, which mixture is supplied to the hydrocarbon hydrate. The mixture can be provided in a mixing container on a surface of the geological formation. In this case, the mixing device of the inventive deposition device preferably comprises the container and a dissociation agent supply connected with the container. Furthermore, the container preferably comprises a stirring device for mechanically mixing the liquid carbon dioxide and the dissociation agent in the container.

Alternatively, the mixture is prepared by providing a flow of the liquid carbon dioxide and injecting the dissociation agent into the liquid carbon dioxide flow. In this case, the mixing device of the inventive deposition device preferably comprises an injection device, e. g an injection nozzle connected with the supply device. As another alternative, the dissociation agent can be delivered into a conduit for the liquid carbon dioxide prior to a static mixer, which provides mixing of the dissociation agent with the liquid carbon dioxide as the two components move through the mixer. The liquid carbon dioxide flow including the injected dissociation agent is inserted into the hydrocarbon hydrate. Depending on the particular application conditions, a continuous or discontinuous injection can be provided, e. g. for adjusting the concentration of the dissociation agent. The discontinuous injection may comprise e. g. an initial injection for a limited initial time.

According to certain preferred embodiments of the invention, the concentration of the dissociation agent in the liquid carbon dioxide is below 500 ppm, more preferably below 200 ppm, and most preferably below 100 ppm. Furthermore, the concentration of the dissociation agent preferably is at least 20 ppm, more preferably at least 50 ppm. These limits are not exclusive. Hydrate reservoirs with dynamic fluid flow through the hydrate filled sections might require higher amounts and also subsequent continuous or periodic additions of dissociation agent.

The dissociation agent preferably comprises at least one of an inorganic salt, a surface active agent, a hydrate inhibitor and an absorption solution. Examples of these agents and advantages thereof are discussed below.

The embodiments of the invention comprising releasing hydrocarbon gas preferably comprise the step of collecting the hydrocarbon, which preferably includes at least one of methane, ethane and ethylene.

BRIEF DESCRIPTION OF THE DRAWINGS

Further details and advantages of the invention are described in the following with reference to the attached drawing, which show in.

PREFERRED EMBODIMENTS

A preferred embodiment of the invention is described herein with reference to creating a carbon dioxide hydrate by decomposing a methane hydrate. It is emphasized that the implementation of the invention is not restricted to this application, but rather is possible with other hydrocarbon hydrates (natural gas hydrates), e.g., ethane or ethylene hydrates, or the like. Pressure and temperature conditions for the formation of carbon dioxide hydrate correspond sufficiently to those of stability regions of natural gas hydrates for practicing the present invention. The stability regions can be determined from measured values of natural gas hydrates deposits and from experimental data described in published literature.

Figure 1:
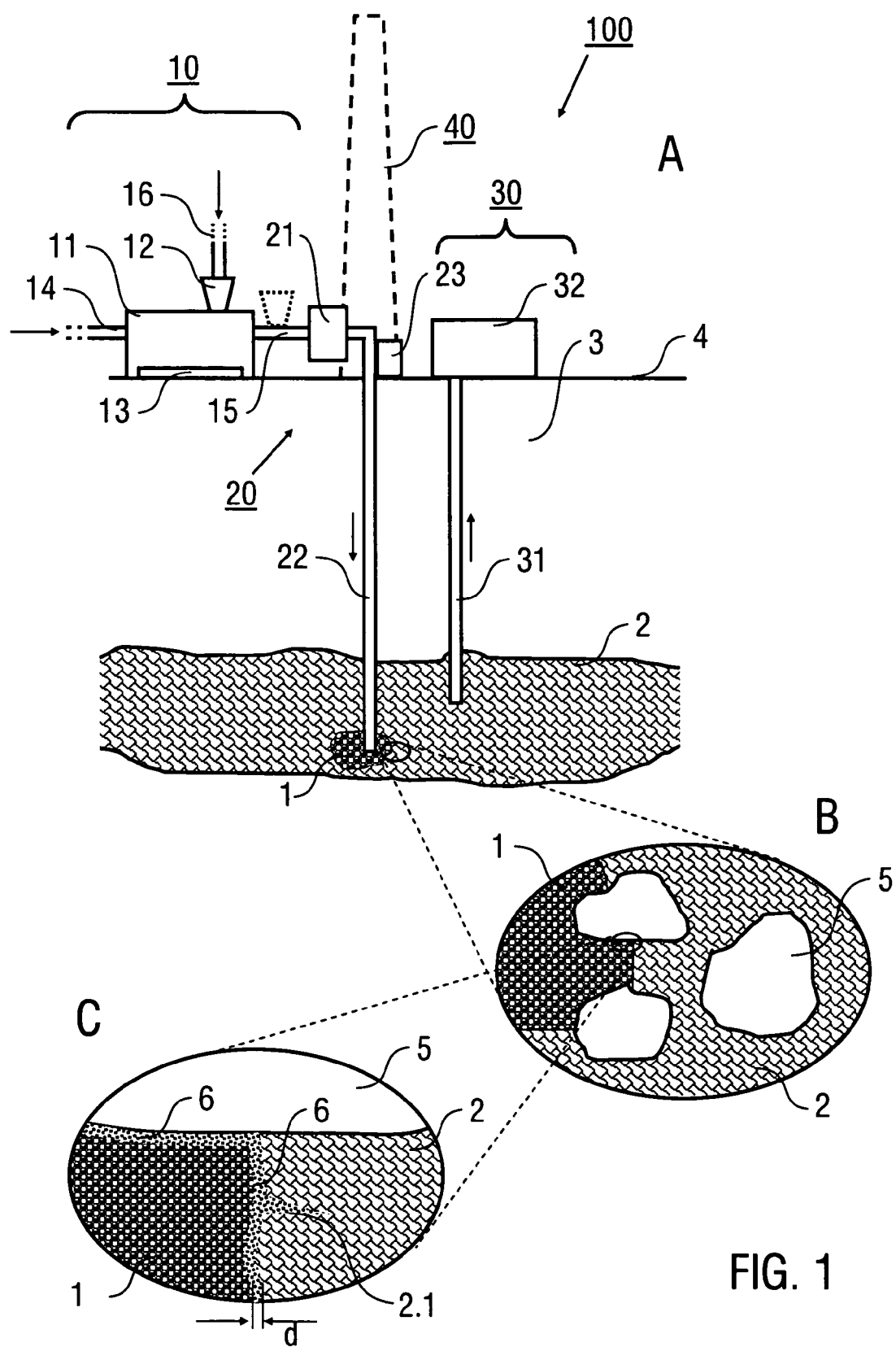
FIG. 1: a schematic illustration of creating a carbon dioxide hydrate by a liquid phase reaction according to the invention.

FIG. 1 schematically illustrates basic features of one embodiment of an inventive deposition device 100 and details of the inventive methods of creating a carbon dioxide hydrate and releasing hydrocarbon gas from a gas hydrate. FIG. 1A illustrates the deposition device 100 being arranged for creating a carbon dioxide hydrate 1 by providing liquid carbon dioxide with a dissociation agent to convert a methane hydrate 2 into water and methane. As illustrated, the methane hydrate 2 is located in a subterranean geological formation 3 on the surface 4 of which the deposition device 100 is operated. The geological formation 3 is a part of the earth's crust, e.g. in a mainland region. Alternatively, the geological formation 3 may comprise an undersea formation, e.g. in an off-shore region. In this case, the deposition device 100 is located on the ocean surface. FIG. 1B schematically illustrates an enlarged sectional view of the methane hydrate 2, which is partially replaced by the carbon dioxide hydrate 1 and further includes, e.g., minerals 5 (e.g. sediment grains). FIG. 1C is a further enlarged sectional view schematically illustrating the boundary conditions between the carbon dioxide hydrate 1, the methane hydrate 2 and the mineral 5.

The deposition device 100 comprises a mixing device 10, a supply device 20, a collection device 30 and a borehole device 40. Generally, the deposition device 100 may have a structure similar to an oil or natural gas well being modified for implementing in particular the mixing device 10 and the supply device 20.

The mixing device 10 includes a container 11 provided with a dissociation agent supply 12 and a stirring device 13. The container 11 being made of thermally insulating walls further comprises an inlet tube 14 through which liquid carbon dioxide is supplied, and an outlet tube 15 connecting the container 11 with the supply device 20. The container 11 has an inner volume for accommodating liquid carbon dioxide. The inner volume is selected depending on particular conditions of implementing the invention, in particular, depending on a size of the hydrate field. Additionally, a cooling device (not shown) may be provided in thermal contact with the container 11. If the carbon dioxide is liquefied in the container 11, it may be provided with a compressor (not shown).

The dissociation agent supply 12 includes a nozzle (not shown), which opens through the wall of the container 11 into the interior space thereof. The dissociation agent supply 12 is arranged for introducing a predetermined amount of a dissociation agent into the liquid carbon dioxide in the container 11. The dissociation agent supply 12 is connected via a supply tube 16, which may include a controllable valve (not shown), with a dissociation agent reservoir (not shown).

According to an alternative embodiment of the invention, the dissociation agent supply 16 is connected with the outlet tube 15 (illustrated with dotted lines). With this embodiment, the dissociation agent is injected into the liquid carbon dioxide supply to the geological formation 3.

The supply device 20 comprises a compressor station 21 and a supply tubing 22. The compressor station 21 is arranged for subjecting the mixture of liquid carbon dioxide and the dissociation agent to an increased supply pressure, e.g., in the range of 10 to 100 bar overpressure based on local static reservoir pressure of injection zone in the reservoir of methane hydrate 2. The supply tubing 22 comprises e.g. a solid steel tube with a perforation at the distal end extending into the methane hydrate 2. The supply tubing 22 has an inner diameter which is selected depending on particular conditions of implementing the invention and typically amounts to, e.g., about 10 cm to about 30 cm. Other diameters may be used as necessary for the conditions and can be calculated by those skilled in the relevant art.

The decomposing and carbon dioxide hydrate formation steps can be accelerated if cracks 2.1 are formed in the methane hydrate 2. To this end, the supply device 20 may be provided with a vibration device 23. The vibration device 23 preferably is arranged at the surface 4 in mechanical contact with the supply tubing 22 (as illustrated) or, alternatively, at the distal end of the supply tubing 22 in the methane hydrate 2. The vibration device 23 is adapted for subjecting the surrounding material to mechanical vibrations so that the formation of the cracks 2.1 (FIG. 1C) is facilitated. To this end, the vibration device 23 comprises, e.g., a seismic source, like a magnetostrictive actuator. Application of energy to facilitate crack formation and/or enlargement may be supplied by any known method.

The collecting device 30 comprises a discharge tubing 31 and a methane collector 32. The discharge tubing 31 comprises a solid tube, which may be arranged separated from the supply tubing 22 (as illustrated) or, alternatively, within the same borehole adjacent with the supply tubing 22. The methane collector 32 comprises a gas tank accommodating the released methane from the methane hydrate 2.

The operation of the deposition device 100 comprises the following steps. Firstly, a substance composition including liquid carbon dioxide and a dissociation agent is provided with the mixing device 10. To this end, liquid carbon dioxide is introduced via the inlet tube 14, while the dissociation agent is injected via the dissociation agent supply 12. Injection of dissociation agent is adjusted such that a preferred concentration of the dissociation agent in the liquid carbon dioxide of about 100 ppm is obtained. Depending on the dissociation agent, larger or smaller concentrations can be set. The mixture of the carbon dioxide and the dissociation agent is carried through the supply tubing 22 into the methane hydrate 2. The supply pressure is adjusted such that sufficient carbon dioxide including the dissociation agent is provided for conversion of the methane hydrate 2 to methane and water and, subsequently, forming carbon dioxide hydrate at the best rate. Accordingly, during creating a carbon dioxide hydrate by replacing the methane hydrate 2 by the carbon dioxide hydrate 1, an increasing supply pressure may be produced with an increasing volume of the carbon dioxide hydrate 1.

The mixture of liquid carbon dioxide and the dissociation agent is introduced into the methane hydrate 2 surrounding the supply tubing 22. The dissociation agent facilitates the decomposing of the methane hydrate into methane and liquid water. Subsequently, the carbon dioxide hydrate is formed from the liquid carbon dioxide and the liquid water. As a result, an increasing region of carbon dioxide hydrate 1 is formed into the methane hydrate 2 as schematically illustrated in FIG. 1B. Because the carbon dioxide hydrate and the methane hydrate do not stick to minerals for thermodynamic reasons, transport channels exist for supplying the liquid carbon dioxide into the methane hydrate even with the growth of the carbon dioxide hydrate 1. Further transport channels are present in the carbon dioxide hydrate 1.

With the further enlarged view of FIG. 1C it is illustrated that a liquid phase boundary (water layer) 6 is formed between the methane hydrate 2 and the carbon dioxide hydrate 1. The liquid phase boundary 6 extends between both hydrates 1, 2 and along surfaces of the minerals 5 as well as along cracks 2.1 in the methane hydrate 2. Accordingly, a liquid connection between the supply tubing 22 and the methane hydrate 2 is continuously kept. Although not being bound by theory, it is believed that the dissociation agent included in the liquid carbon dioxide facilitates breaking the hydrogen bonds of the methane hydrate, so that the liquid water is released to the liquid phase boundary 6. Because the dissociation agent, as such, does not form a hydrate state, it remains at least in part included in the liquid water. Simultaneously, the carbon dioxide hydrate 1 is formed under the influence of temperature and pressure in the subterranean geological formation.

The liquid phase boundary 6 is shifted gradually towards the methane hydrate 2, which preferably is completely replaced by the carbon dioxide hydrate 1. The liquid phase boundary 6 is a liquid water layer having a thickness d typically in the range of 10 μm to 100 μm. Despite this reduced thickness, the reaction rate compared with the solid state diffusion preferably is essentially accelerated even if the liquid phase boundaries or cracks have a smaller thickness even down to the range of 100 nm to 10 nm. Even with these small dimensions, the useful decomposing and carbon dioxide hydrate forming steps can be provided. Furthermore, due to the dimensions of the liquid phase boundaries, the stability of the geological formation preferably is kept during the deposition of the carbon dioxide and collection of the hydrocarbon gas. It is conceived that higher pressures when providing liquid carbon dioxide can provide increased thickness for cracks and liquid phase boundaries.

The dissociation agent, e. g. a surfactant will follow the interface between water and $CO_2$. The spreading pattern of the injected $CO_2$ and the corresponding contact area between injected $CO_2$ and solid hydrate determines if all surfactant can be injected over a limited initial time or additional dissociation agent addition may be needed at a later stage. This analysis can be conducted prior to injection based on available geological data and/or core samples from the reservoir.

Figure 2:
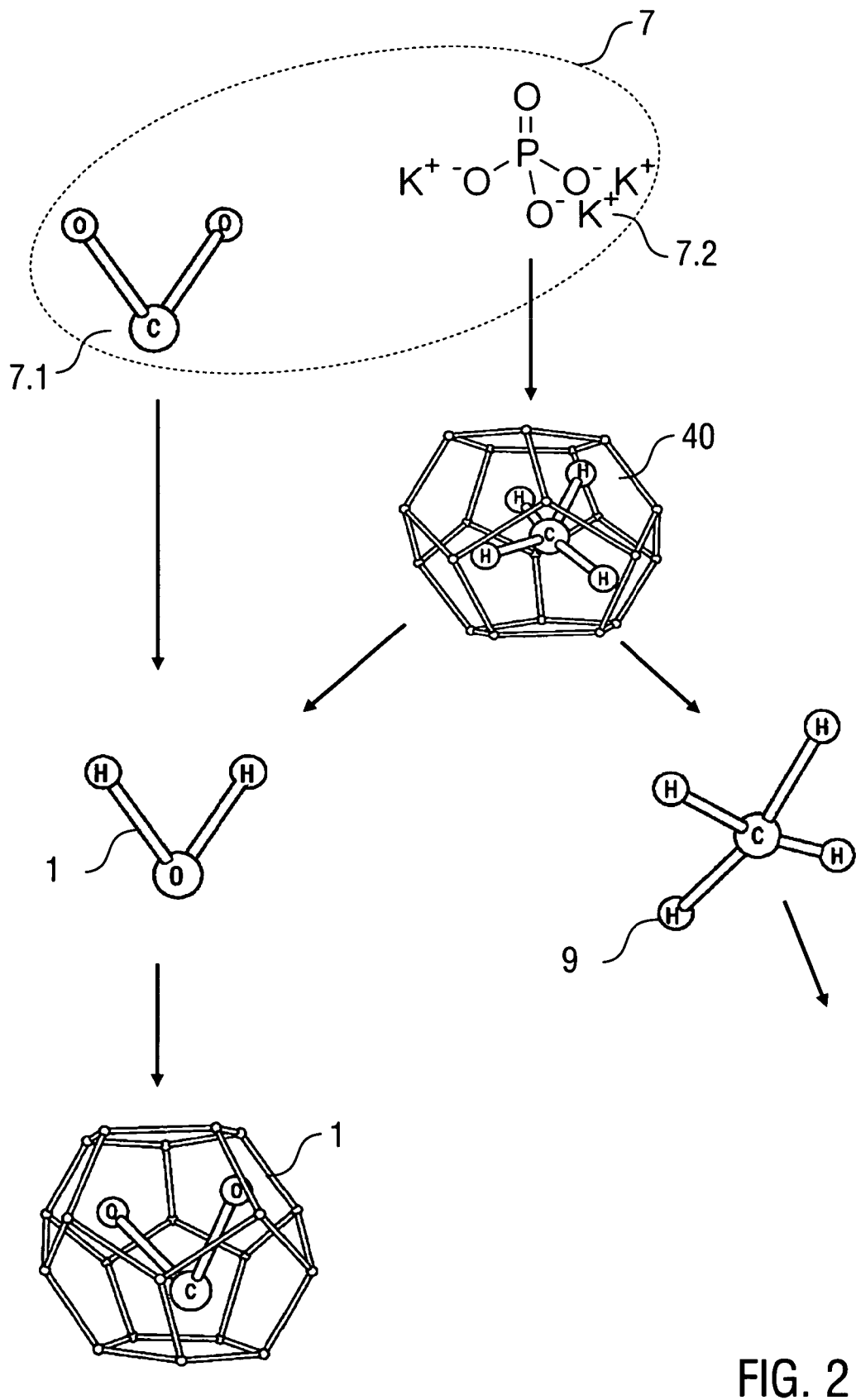
FIG. 2: a diagram illustrating schematically the dissociation of a hydrocarbon gas hydrate and the formation of a carbon dioxide hydrate according to the invention.

The reaction at the liquid phase boundary 6 is schematically illustrated with further details in FIG. 2. The inventive substance composition 7 including liquid carbon dioxide 7.1 and the dissociation agent 7.2, e.g., potassium phosphate is provided in contact with the methane hydrate 2, which is dissociated into liquid water 8 and methane gas 9. The carbon dioxide 7.1 reacts with the liquid water 8 so that the carbon dioxide hydrate 1 is formed. The methane gas 9 is released and delivered to the surface 4 of the geological formation 3 (FIG. 1).

The released methane is collected in the methane collector 32. Methane collector 32 can be provided with membranes for gas separation of methane and carbon dioxide for separating residual amounts of carbon dioxide included in the collected methane. Gas separation membranes useful for this purpose include, e.g., hexafluoropropane-dianhydride (6FDA) or dimer-captopropane-sulfonate (DMPS) or polyethylene-glycol with a methylene-diphenylene-diisocyanate-hard segment (PEG/MDI-MDEA-MDI), or the like.

Various groups of dissociation agents, which are for the practice of the invention for decomposing the hydrocarbon hydrate are described below. The suitability of such agents for dissociating hydrocarbon hydrates under real pressure and temperature conditions have been shown in laboratory experiments.

1. Surfactants (Surface Active Agents)

Surfactants are dissociation agents, which facilitate the disruption of the hydrogen bonds between water and hydrocarbon in the hydrocarbon hydrate. This results in the formation of liquid water and hydrocarbon gas and preferably the mass transport rate can be increased, in particular, by several orders of magnitude.

The surfactants may comprise ionic surfactants, which comprise, e.g., at least one negatively charged group or an anion of, e.g., at least one of a sulfonate, carboxylate and phosphate group, or an anion and/or at least one positively charged group or cation of, e.g., at least one of sodium, potassium, ammonium and kalium, and/or an acid group.

Ionic surfactants have particular advantages in a high dissociation efficiency for decomposing the hydrocarbon hydrate.

Furthermore, the surfactants may comprise non-ionic surfactants, e.g., including at least one of alcohol ethoxylates, glycosides, glucamides and esters.

As a further example, the surfactants may comprise biosurfactants, i.e., surface active agents, which are included in biological materials, e.g., biological cells or parts thereof. Preferred examples of biosurfactants are trehalose and lipids. Advantageously, the biosurfactants are active molecules in the dissolution of the hydrocarbon hydrate surface. However, they do not decompose the freshly formed carbon dioxide hydrate as this has a higher thermodynamical stability.

2. Hydrate Inhibitors

Generally, an agent that inhibits the formation of hydrocarbon hydrate, which includes any molecule with a chain of C-atoms having polar components at one end can be used as hydrate inhibitor. With increased chain length, the active interfaces between water and carbon dioxide are broadened so that the efficiency of hydrocarbon decomposition is improved. The polar components stick to the hydrocarbon hydrate, while the non-polar backbone (C chain) is directed to the liquid carbon dioxide.

Hydrate inhibitors used according to the invention furthermore comprise e.g. amines, compounds with oxygen double bounded to ring structures or carbon pattern in chained backbones, and alcohol groups, in particular with a chain length distribution facilitating $CO_2$ diffusion through the hydrate inhibitor. A preferred chain length of chained backbones ranges from 10 to 15 carbon atoms, but can be higher for small concentrations.

3. Absorption Solutions

A third group of dissociation agents comprises absorption solutions, which have the advantage of increasing the carbon dioxide solubility in the liquid water. Accordingly, the absorption solutions have a double function of dissociating the hydrocarbon hydrate and improving the carbon dioxide hydrate formation.

Examples of absorption solutions, which can be used according to the invention, comprise e.g. a modified diisopropanolamine (DIPA), which is a reacting amine but can be made non-reactive by replacing hydrogen on nitrogen with alkanes ($CH_3$ or longer). Further examples comprise methyl-di-ethyl-amine (MDEA) or NAM/NFM (NAM: N-Acetylmorpholin, NFM: N-Formylmorpholine). Another useful dissociation agent comprises chitosan.

4. Inorganic Salt

Examples of inorganic salts used as dissociation agents comprise at least one of e.g. potassium phosphate, kalium phosphate, sodium chloride, and kalium chloride. Alternatively, any inorganic salt can be used having a solubility in water comparable with the solubility of the above salts.

A particularly preferred example of a salt used is potassium phosphate (illustrated in FIG. 2), which is also known as a food additive under number E340. This hydrate inhibitor has particular advantages as it is environmentally friendly and very inexpensive.

Useful dissociation agents can be determined by a simple test, i.e., contacting a hydrocarbon hydrate with the proposed dissociation agent to see whether the hydrate decomposes into liquid water and hydrocarbon gas. Any agent determined to be useful by such test can be used in the practice of this invention. Of course, some agents will be more useful than others due to the rate of decomposition.

The features of the invention disclosed in the above description, the drawings and the claims can be of significance both individually as well as in combination for the realization of the invention in its various embodiments. Upon consideration of the disclosure herein, those skilled in the art may make modifications and improvements within the spirit and scope of this invention.

The invention claimed is:

1. A method of creating a carbon dioxide hydrate, the method comprising the steps of:
   supplying liquid carbon dioxide and a dissociation agent to a hydrocarbon hydrate,
   decomposing the hydrocarbon hydrate by the dissociation agent into a hydrocarbon gas and liquid water, and
   forming the carbon dioxide hydrate from the liquid carbon dioxide and the liquid water, wherein
   a liquid phase boundary is formed between the hydrocarbon hydrate and the carbon dioxide hydrate, and
   the liquid phase boundary is shifted with continued supplying of liquid carbon dioxide, so that the hydrocarbon hydrate is gradually replaced by the carbon dioxide hydrate.

2. The method of claim 1, wherein the decomposing step comprises
   facilitating disrupting hydrogen bonds of the hydrocarbon hydrate by the dissociation agent so that the liquid water is formed, wherein
   at least a portion of the dissociation agent is dissolved in the liquid water.

3. The method of claim 1, wherein
   the dissociation agent does not form a hydrate.

4. The method of claim 1, wherein
   at least a portion of the dissociation agent is included in the liquid water after the decomposing step.

5. The method of claim 1, wherein
   at least a portion of the dissociation agent is included in the liquid phase boundary.

6. The method of claim 1, wherein the supplying step comprises
   providing a mixture of the liquid carbon dioxide and the dissociation agent, and
   supplying the mixture to the hydrocarbon hydrate.

7. The method of claim 6, wherein the supplying step comprises
   providing a flow of the liquid carbon dioxide,
   mixing the dissociation agent into the liquid carbon dioxide flow, and
   supplying the liquid carbon dioxide flow including the dissociation agent to the hydrocarbon hydrate.

8. The method of claim 7, wherein
   the dissociation agent is mixed into the liquid carbon dioxide flow by a continuous or discontinuous injection.

9. The method of claim 7, wherein
   the dissociation agent is mixed into the liquid carbon dioxide flow by a stationary mixer in the liquid carbon dioxide flow.

10. The method of claim 1, wherein the hydrocarbon comprises
    at least one of methane, ethane or ethylene.

11. The method of claim 1, wherein
    a concentration of the dissociation agent in the liquid carbon dioxide is below 500 ppm.

12. The method of claim 1, wherein
    a concentration of the dissociation agent in the liquid carbon dioxide is below 200 ppm.

13. The method of claim 1, wherein the dissociation agent comprises at least one of
    an inorganic salt, a surface active agent, a hydrate inhibitor, or an absorption solution.

14. The method of claim 13, wherein the inorganic salt comprises at least one of
    potassium phosphate, kalium phosphate, sodium chloride, or kalium chloride.

15. The method of claim 13, wherein the hydrate inhibitor comprises at least one of (i) an amine, (ii) an oxygen double bounded to a ring structure or a carbon pattern in a chain backbone, or (iii) an alcohol group.

16. The method of claim 15, wherein the hydrate inhibitor comprises an agent having chain length distribution facilitating $CO_2$ diffusion through the hydrate inhibitor.

17. The method of claim 13, wherein the absorption solution comprises at least one of an amine or a substance including alcohol groups.

18. The method of claim 17, wherein the absorption solution comprises a limited size molecular structure selected from monodiethanol amine (MDEA) or dipropanolamine (DIPA).

19. The method of claim 1, further comprising the step of collecting the hydrocarbon.

20. The method of claim 1, wherein the carbon dioxide hydrate is formed in a subterranean geological formation, in which the hydrocarbon hydrate is located.

21. The method of claim 1, further comprising the step of subjecting the hydrocarbon hydrate to a mechanical vibration.

22. A method of releasing a hydrocarbon gas from a hydrocarbon hydrate in a geological formation, the method comprising the steps of:
    supplying liquid carbon dioxide and a dissociation agent to the hydrocarbon hydrate,
    facilitating decomposing the hydrocarbon hydrate by the dissociation agent, the hydrocarbon hydrate decomposing into a hydrocarbon gas and liquid water, and
    delivering the hydrocarbon gas to a surface of the geological formation,. wherein
    a liquid phase boundary is formed between the hydrocarbon hydrate and the carbon dioxide hydrate, and
    the liquid phase boundary is shifted with continued supplying of liquid carbon dioxide, so that the hydrocarbon hydrate is gradually replaced by the carbon dioxide hydrate.

23. A method of creating a carbon dioxide hydrate, the method comprising the steps of:
    supplying liquid carbon dioxide and a dissociation agent to a hydrocarbon hydrate,
    decomposing the hydrocarbon hydrate by the dissociation agent into a hydrocarbon gas and liquid water, and
    forming the carbon dioxide hydrate from the liquid carbon dioxide and the liquid water,
    wherein the dissociation agent comprises at least one of an inorganic salt, a surface active agent, a hydrate inhibitor, or an absorption solution,
    wherein the surface active agent comprises at least one of
    an ionic surfactant,
    a non-ionic surfactant, or
    a biosurfactant.

24. The method of claim 23, wherein the ionic surfactant comprises at least one of (i) a negatively charged group or anion of at least one of a sulfonate, carboxylate or phosphate group or (ii) an anion and/or at least one positively charged group or cation of at least one of potassium, ammonium or kalium cation, and/or (iii) an acid group.

25. The method of claim 23, wherein the non-ionic surfactant comprises at least one of an alcohol ethoxylate, a glycoside, a glucamide or an esters.

26. The method of claim 23, wherein the biosurfactant comprises at least one of a trehalose or a lipid.

* * * * *